(12) United States Patent
Inomoto

(10) Patent No.: US 9,389,498 B2
(45) Date of Patent: Jul. 12, 2016

(54) 3D-IMAGE PICKUP OPTICAL SYSTEM AND 3D-IMAGE PICKUP APPARATUS

(71) Applicant: CANON KABUSHIKI KAISHA, Tokyo (JP)

(72) Inventor: Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 13/856,546

(22) Filed: Apr. 4, 2013

(65) Prior Publication Data

US 2013/0278731 A1    Oct. 24, 2013

(30) Foreign Application Priority Data

Apr. 19, 2012   (JP) .................................. 2012-095575

(51) Int. Cl.
*G03B 35/10* (2006.01)
*G02B 27/22* (2006.01)
*H04N 13/02* (2006.01)

(52) U.S. Cl.
CPC ................ *G03B 35/10* (2013.01); *G02B 27/22* (2013.01); *H04N 13/021* (2013.01)

(58) Field of Classification Search
CPC ....... G03B 35/10; H04N 13/021; G02B 27/22
USPC ........................................... 348/49; 359/462
See application file for complete search history.

(56) References Cited

U.S. PATENT DOCUMENTS

| 6,288,838 | B1 * | 9/2001 | Ito ................................ 359/377 |
| 6,317,260 | B1 * | 11/2001 | Ito ................................ 359/377 |
| 6,686,988 | B1 * | 2/2004 | Sugawara ..................... 355/22 |
| 2001/0004298 | A1 * | 6/2001 | Kobayashi .................. 359/462 |
| 2002/0118450 | A1 * | 8/2002 | Ito et al. ....................... 359/385 |
| 2006/0268152 | A1 * | 11/2006 | Uchiyama et al. ............ 348/362 |
| 2011/0261445 | A1 * | 10/2011 | Mizuta .......................... 359/376 |
| 2012/0008194 | A1 * | 1/2012 | Mizuta et al. ................. 359/377 |

FOREIGN PATENT DOCUMENTS

JP          2000-019663 A      1/2000

* cited by examiner

*Primary Examiner* — Christopher S Kelley
*Assistant Examiner* — Zhihan Zhou
(74) *Attorney, Agent, or Firm* — Rossi, Kimms & McDowell LLP

(57) ABSTRACT

A 3D-image pickup optical system includes: a pair of optical systems each of which includes a magnification-varying lens unit, an aperture stop, a first lens unit and a first reflective member in a sequential order from an object side, the optical systems having optical axes offset from each other; a second lens unit that receives object light fluxes from the pair of optical systems; a second reflective member that guides the object light fluxes from the pair of optical systems to the second lens unit; and a switching unit that is disposed in an object side of the second reflective member, and alternately guides the pair of the object light fluxes respectively from the pair of optical systems to the second reflective member.

9 Claims, 7 Drawing Sheets

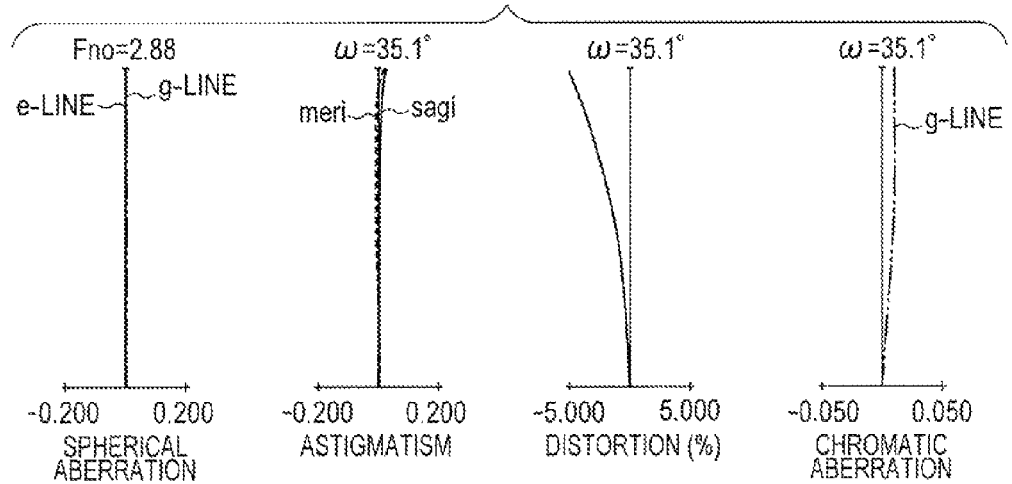
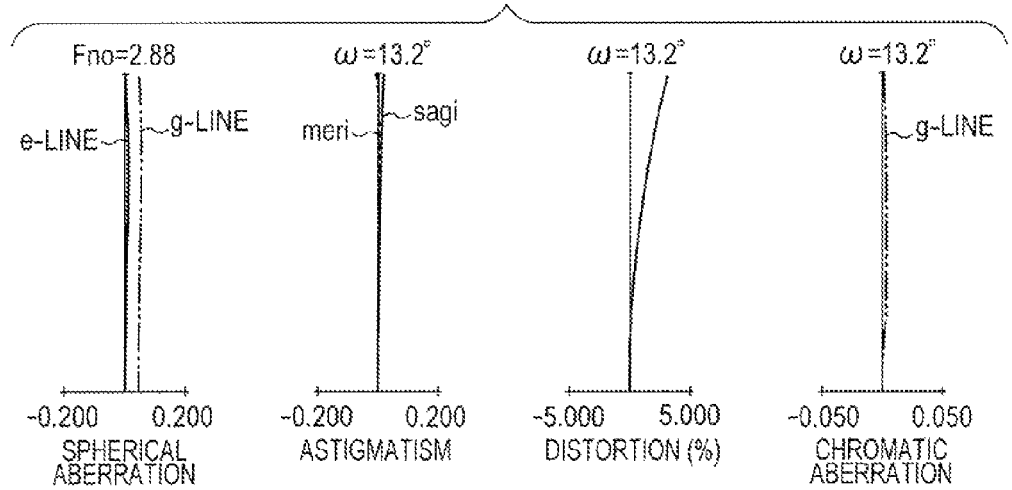
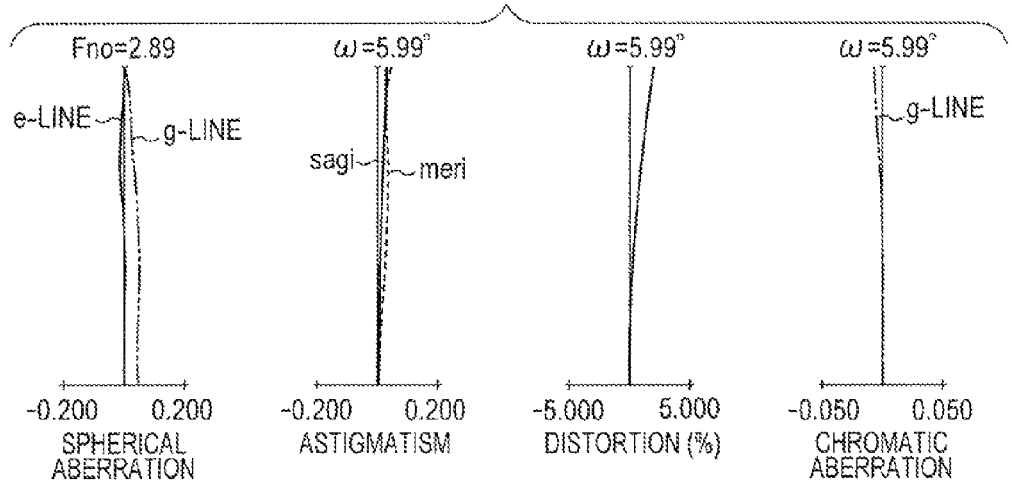

3D-IMAGE PICKUP OPTICAL SYSTEM AND 3D-IMAGE PICKUP APPARATUS

BACKGROUND OF THE INVENTION

1. Field of the Invention

The present invention relates to a 3D-image pickup optical system used for a 3D-image pickup apparatus employing one of a digital camera, a video camera and a broadcasting camera, and to the 3D-image pickup apparatus. In particular, the present invention relates to a 3D-image pickup optical system used for a 3D-image pickup apparatus that takes right and left images of an object having a parallax with one camera through two image pickup lenses.

2. Description of the Related Art

Conventionally, various apparatuses have been proposed that take right and left images with a parallax for viewing the images as stereoscopic images. For instance, Japanese Patent Application Laid-Open No. 2000-019663 proposes a 3D-image pickup apparatus that takes right and left images with a parallax with one camera particularly through two image pickup lenses, and a zoom lens dedicated for 3D-image pickup.

In the conventional art disclosed in Japanese Patent Application Laid-Open No. 2000-019663, a stop is disposed nearer an object than a varying magnification unit is to suppress increase in front lens diameter, thereby securing a human binocular disparity (ca. 65 mm). However, the conventional art disclosed in Japanese Patent Application Laid-Open No. 2000-019663 has a problem of an increase in the f-number with zooming up, and further has problems of difficulty in achieving a wider angle and a higher varying magnification and difficulty in achieving an optical performance capable of being viewed in a HD image quality.

SUMMARY OF THE INVENTION

The present invention provides a 3D-image pickup optical system and a 3D-image pickup apparatus that realize a HD image quality in picking up 3D-images with one camera to take right and left images having a parallax through two image pickup lenses, have a high magnification, are compact in size, and suppress variation in f-number with zooming.

A 3D-image pickup optical system of the present invention to achieve the above object includes: a pair of optical systems each of which includes a magnification-varying lens unit, an aperture stop, a first lens unit and a first reflective member in a sequential order from an object side, the optical systems having optical axes offset from each other; a second lens unit that receives object light fluxes from the pair of optical systems; a second reflective member that guides the object light fluxes from the pair of optical systems to the second lens unit; and a switching unit that is disposed in an object side of the second reflective member, and alternately guides the pair of the object light fluxes respectively from the pair of optical systems to the second reflective member.

In picking up 3D-images with one camera to take right and left images having a parallax through two image pickup lenses disposed with optical axes offset from each other, this configuration allows a 3D-image pickup optical system and a 3D-image pickup apparatus to be provided that realize a HD image quality, have a high magnification, are compact in size, and suppress variation in f-number with zooming.

Further features of the present invention will become apparent from the following description of exemplary embodiments with reference to the attached drawings.

BRIEF DESCRIPTION OF THE DRAWINGS

FIG. 3A is an aberration diagram of the 3D-image pickup optical system of Embodiment 1 when being focused at an object distance of 2 m at the wide angle end.

FIG. 3B is an aberration diagram of the 3D-image pickup optical system of Embodiment 1 when being focused at the object distance of 2 m at an intermediate focal length.

FIG. 3C is an aberration diagram of the 3D-image pickup optical system of Embodiment 1 when being focused at the object distance of 2 m at a telephoto end.

DESCRIPTION OF THE EMBODIMENTS

Figure 1:
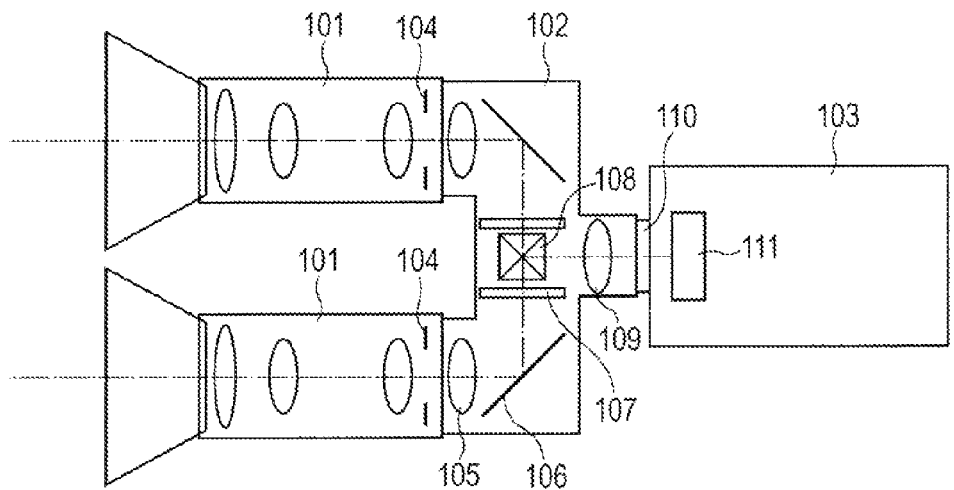
FIG. 1 is a schematic diagram illustrating a configuration of 3D-image pickup apparatus of the present invention.

Exemplary embodiments of the present invention will hereinafter be described in detail with reference to accompanying drawings. FIG. 1 is a schematic diagram of a 3D-image pickup apparatus including a 3D-image pickup optical system pertaining to an exemplary embodiment of the present invention.

Embodiment 1

Hereinafter, referring to FIG. 1, a schematic configuration of a 3D-image pickup apparatus (3D-image pickup optical system) according to Embodiment 1 of the present invention will be described.

For taking object images with a parallax, the 3D-image pickup apparatus of this embodiment includes: magnification-varying lens units 101 that are a pair of right and left optical systems having optical axes offset from each other; an image combining unit 102 that is an optical system for combining right and left images; and an image pickup camera 103 to which an interchangeable lens is mountable. Each of the pair of right and left magnification-varying lens units 101 includes an aperture stop 104. The image combining unit 102 includes: a pair of right and left lens units 105; a pair of right and left reflective members 106 for deflecting the respective optical axes; switching members (image switching units) 107 that are units of alternately switching right and left images to allow the images to pass in a time division manner; a reflective member 108 for deflecting the optical axes and causing the optical axes of the right and left magnification-varying lens units to coincide with the optical axis of a lens unit 109 disposed on an after-mentioned image plane side; and the lens unit 109. The reflective member 106 may be one of a total reflection mirror and a prism. The switching members 107 may be one of a liquid crystal shutter and a mechanical shutter. The reflective member 108 may be one of a polarization beam splitter prism and a half mirror prism. The image combining unit 102 includes an attaching member 110 for detachably attaching a camera. The image pickup camera 103 includes an image pickup unit 111 that receives object light having passed through the optical systems and arrived. In the case of one image pickup element, the image pickup unit 111 includes an image pickup element. In the case where three image pickup elements in conformity with three colors are used, the image pickup unit 111 includes a color splitting optical system that splits (color-splits) object light, and three image pickup elements. Here, the image pickup element may be a CCD, a CMOS and an image pick-up tube. One of a filter blocking infrared rays, a filter blocking ultraviolet rays and an ND-filter for adjusting the light intensity may be disposed immediately before each image pickup element.

In actual imaging, the switching member 107 is required to be driven to allow light fluxes of right and left images to alternately pass in a time division manner and independently guide the light fluxes to the image pickup unit 111.

A specific configuration and operation procedures in the case where the switching member 107 is a liquid crystal shutter will hereinafter be described. In this case, the driving is suitably controlled such that the polarization states of the passing light fluxes are orthogonal to each other. For illustration purpose, it is hereinafter be provided that the light flux incident from the right lens (hereinafter, described as a right light flux) is s-polarized light, and the light flux incident from the left lens (hereinafter, described as left light flux) is p-polarized light.

Figure 12:
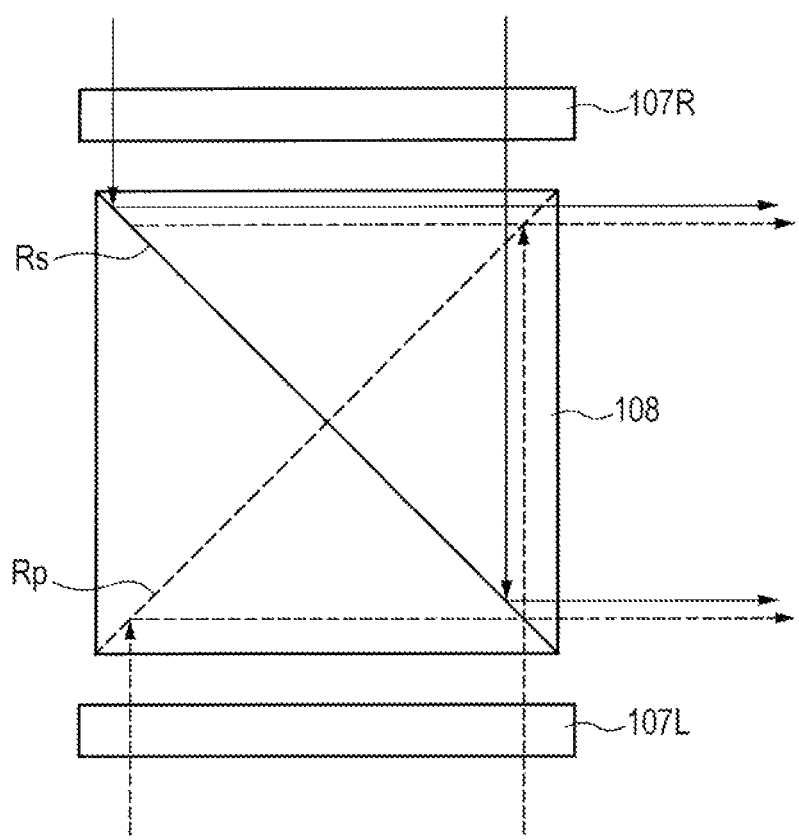
FIG. 12 is a schematic diagram of liquid crystal shutters and a polarization beam splitter.

FIG. 12 is a schematic diagram illustrating liquid crystal shutters as switching members 107, and a polarization beam splitter prism as the reflective member 108. The liquid crystal shutters are a liquid crystal shutter 107R that allows the right light flux to pass as s-polarized light or blocks the flux, and a liquid crystal shutter 107L that allows the left light flux to pass as p-polarized light or blocks the flux. In the polarization beam splitter prism 108, a surface Rs reflects only s-polarized light and a surface Rp reflects only p-polarized light. That is, the right light flux (solid line arrows), which is the s-polarized light having passed through the liquid crystal shutter 107R, is reflected only by the surface Rs, and the left light flux (broken line arrows), which is the p-polarized light having passed through the liquid crystal shutter 107L, is reflected only by the surface Rp. Here, according to a suitable operation, in even-numbered (odd-numbered) frames, the right light flux is allowed to pass while the left light flux is blocked, and, in odd-numbered (even-numbered) frames, the left light flux is allowed to pass while the right light flux is blocked. This configuration enables right and left images to be alternately and independently guided to the image pickup unit 111.

This configuration can provide a zoom lens dedicated for 3D-image pickup and a 3D-image pickup apparatus capable of taking right and left images with a parallax with one camera through two image pickup lenses.

Hereinafter, referring to FIG. 2, the detailed configuration of a 3D-image pickup apparatus of Embodiment 1 according to the present invention will be described.

The 3D-image pickup apparatus includes a pair of right and left magnification-varying lens units 201, a pair of right and left aperture stops 202, a pair of right and left first lens units 203, a pair of right and left first reflective members 204 for deflecting the respective optical axes, a pair of right and left shutters 205 that are units for allowing right and left light fluxes to be alternately switched and pass in a time division manner, and a second reflective member 206 for deflecting the optical axes and causing the optical axes of the right and left images to coincide with each other. A pair of right and left shutters 205 is disposed in an object side of the second reflective member 206 in the respective optical paths. In the 3D-image pickup apparatus, a second lens unit 207, a color splitting optical system 208 and an image plane 209, which are shared by right and left light fluxes, are disposed on an optical path with which optical paths for light fluxes entering from the right and left lens systems are allowed to coincide with each other by the second reflective member 206.

The first lens unit 203 includes one positive lens, and a cemented lens having one positive lens and one negative lens, in the sequential order from the object side. Likewise, the second lens unit 207 is an immobile and fixed lens unit including one positive lens, a cemented lens having one positive lens and one negative lens, and one positive lens in the sequential order from the object side.

To reduce light intensity of a solid image pickup element, such as a CCD, and reduce white shading in the color splitting optical system, the exit pupil position can be disposed distant from the image plane 209 to configure an image-side telecentric optical system.

In image pickup apparatuses, such as single-lens reflex cameras and cameras including color splitting optical systems, interchangeable lenses require a relatively long back focus. Likewise, in such a case, the zoom lens according to the present invention suitably has a relatively long back focus.

In picking up 3D-images, the angle of convergence of right and left magnification-varying lens units is desirably adjusted according to the object distance. Accordingly, to change the optical axis angles of the right and left magnification-varying lens units 201 by the same amount in directions opposite to each other, a suitable configuration includes: a moving mechanism that is a unit of moving at least one pair of lenses of the first lens units in a plane perpendicular to the optical axis by the same amount in directions opposite to each other in a plane including the optical axes of the pair of right and left magnification-varying lens units 101; and a controller for performing such driving. In the direction of the distance between the optical axes of the right and left magnification-varying lens units, the zoom lens having the above configuration satisfies a numerical value range defined by the following condition expression (1).

$$-0.050 < fw \times (-1/e + 1/fr2) < 0.080, \quad (1)$$

where e represents an air equivalent interval from the aperture stop 202 to the first surface on the most object side of the second lens unit 207 and is defined as $e=\Sigma(d/nd)$ in which d represents the lens thickness in the optical axis direction or the lens interval and nd represents the refractive index for d-line of a medium filling each interval. fw represents the focal length at the wide angle end, fr2 represents the focal length of the second lens unit 207. The condition expression (1) defines the focal length range of the second lens unit 207.

To dispose the exit pupil position (i.e., the image of the aperture stop) distant from the image plane, the focal length fr2 of the second lens unit 207 is set close to the air equivalent interval e from the aperture stop 202 to the first surface of the second lens unit 207.

Figure 2:
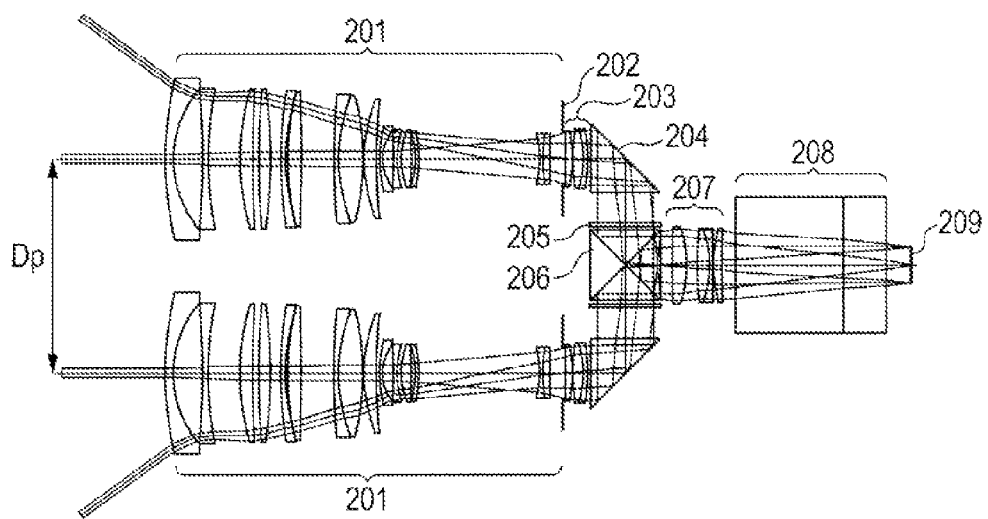
FIG. 2 is an optical path diagram of a 3D-image pickup optical system of Embodiment 1 when being focused at an infinite object distance at a wide angle end.

The stereoscopic effect on viewing varies according to setting of the distance Dp between the optical axes of the pair of right and left magnification-varying lens units 201 illustrated in FIG. 2. A human binocular disparity (distance between optical axes) is about 65 mm. A setting more than the parallax exaggerates the stereoscopic effect on viewing with respect to actuality. A setting less than the parallax reduces the stereoscopic effect on viewing with respect to actuality.

If the lower limit condition of the condition expression (1) is not satisfied, it is difficult to secure an appropriate distance between the optical axes while maintaining a favorable optical performance. If the upper limit condition of the condition expression (1) is not satisfied, it is difficult to maintain the exit pupil position distant from the image plane while maintaining a favorable optical performance. A more suitable condition for the expression (1) is:

$$-0.020 < fw \times (-1/e + 1/fr2) < 0.040 \tag{1a}$$

The zoom lens having the above configuration satisfies a numerical value range defined by the following condition expression (2).

$$1.4 < ndp \tag{2}$$

At least one of the first reflective member 204 and the second reflective member 206 may be a prism made of optical glass material. ndp represents the refractive index for d-line of the prism.

In Embodiment 1 of the present invention, the interval of the reflecting surface of the first reflective member 204 and the reflecting surface of the second reflective member 206 on the optical axis is set to half the distance Dp between the optical axes to acquire an appropriate binocular disparity.

To realize the above configuration, the interval between the aperture stop 202 and the first surface of the second lens unit 207 is required to be larger than that of a typical 2D image pickup lens. However, if a total reflection mirror is adopted as the reflective member to widen the interval, the diameter of the second lens unit 207 is increased and it is difficult to maintain the exit pupil position distant from the image plane, while maintaining a favorable optical performance, and to secure a required back focus.

To address the problem, a prism made of glass material is employed as at least one of the first reflective member 204 and the second reflective member 206, thereby allowing an appropriate distance between the optical axes to be acquired without largely widening the air equivalent interval, which is represented as e=d/nd, where d is the actual interval and nd is the refractive index for d-line.

If the lower limit condition of the condition expression (2) is not satisfied, it is difficult to maintain the exit pupil position distant from the image plane, while maintaining a favorable optical performance, and to secure a required back focus. A more suitable condition for the expression (2) is:

$$1.5 < ndp < 2.3 \tag{2a}$$

The zoom lens having the above configuration satisfies a numerical value range defined by the following condition expression (3).

$$-0.10 < fw/fr < 0.30, \tag{3}$$

where fr is the combined focal length of the first lens unit 203 and the second lens unit 207. The condition expression (3) defines the range of fr with respect to the focal length fw of the entire optical system at the wide angle end.

If fw is small with respect to fr and the lower limit condition of the condition expression (3) is not satisfied, it is difficult to secure the required back focus while maintaining a favorable optical performance. In contrast, fw is large with respect to fr and the upper limit condition of the condition expression (3) is not satisfied, the total length is increased and the diameter of the second lens unit 207 is increased. Accordingly, it becomes difficult to downsize the lens apparatus. A more suitable condition for the expression (3) is:

$$-0.04 < fw/fr < 0.23 \tag{3a}$$

Adoption of the apparatus configuration as described above and satisfaction of the condition expression allows Embodiment 1 of the present invention to provide the zoom lens dedicated for 3D-image pickup and the 3D-image pickup apparatus that realize a HD image quality and a high magnification and are compact in size.

FIG. 2 is an optical path diagram of the 3D-image pickup optical system of Embodiment 1 (Numerical embodiment 1) of the present invention when being focused on an infinite-distance object at the wide angle end. FIG. 3A is a longitudinal aberration diagram of Numerical embodiment 1 when being focused on an object with an object distance of 2 m at the wide angle end. FIG. 3B is a longitudinal aberration diagram of Numerical embodiment 1 when being focused on an object with an object distance of 2 m at an intermediate focal length. FIG. 3C is a longitudinal aberration diagram of Numerical embodiment 1 when being focused on an object with an object distance of 2 m at a telephoto end. The illustration is made with scales where the spherical aberration is 0.2 mm, the astigmatism is 0.2 mm, the distortion is 5% and the lateral chromatic aberration is 0.05 mm. Also in each of the following embodiments, the scales of the aberration diagrams are the same.

According to Numerical embodiment 1 corresponding to Embodiment 1, when the values, such as of the focal length and the air equivalent interval, are substituted in the condition expressions (1) to (3), the values described in the fields of Embodiment 1 of Table 1 are acquired and all the condition expressions are satisfied. The condition expressions (1a), (2a) and (3a) are also satisfied in a more favorable numerical value range. In Numerical embodiment 1, the distance between the optical axes is set such that Dp=65 mm, which is the same as the human binocular disparity. Numerical embodiment 1 thus shows that the zoom lens dedicated for 3D-image pickup that realizes a HD image quality, has a high magnification and is compact in size is realized.

Embodiment 2

A 3D-image pickup optical system of Embodiment 2 of the present invention will hereinafter be described.

The configuration of the 3D-image pickup apparatus of this embodiment is completely identical to that of Embodiment 1.

Figure 4:
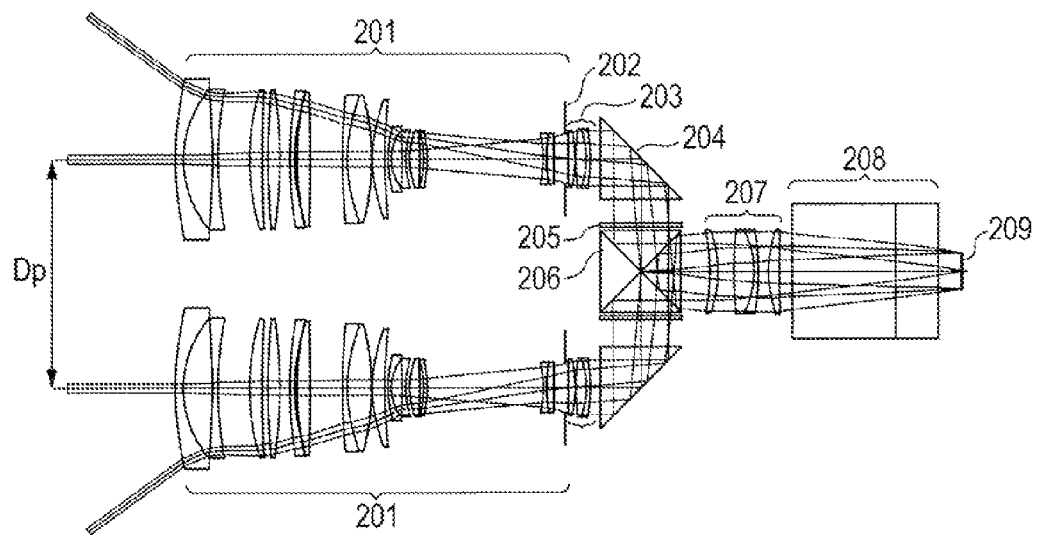
FIG. 4 is an optical path diagram of a 3D-image pickup optical system of Embodiment 2 when being focused at an infinite object distance at a wide angle end.
Figure 5:
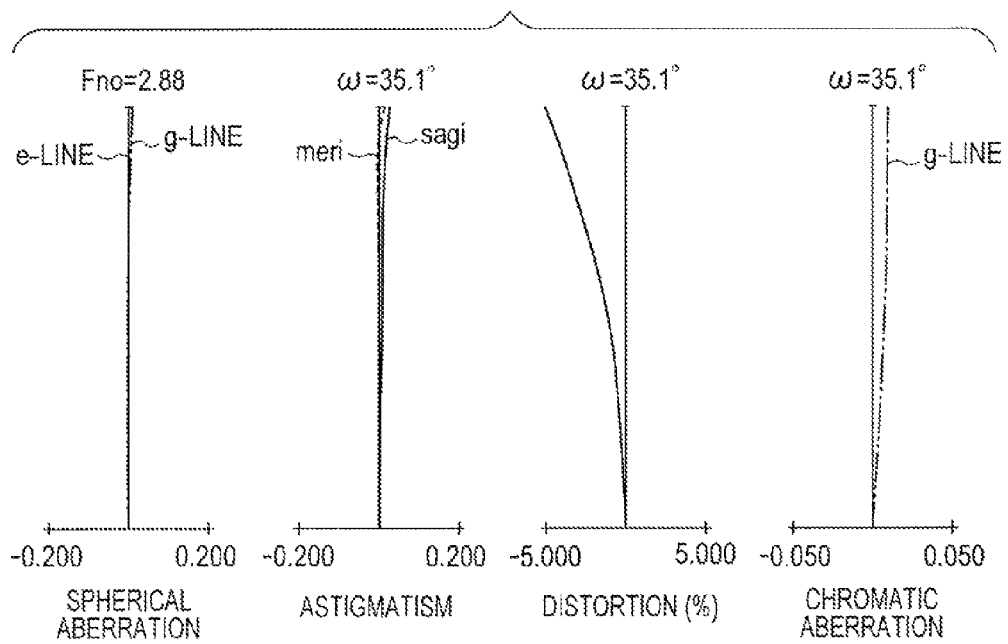
FIG. 5 is an aberration diagram of the 3D-image pickup optical system of Embodiment 2 when being focused at the object distance of 2 m at the wide angle end.

FIG. 4 is an optical path diagram of the 3D-image pickup optical system of Embodiment 2 (Numerical embodiment 2) of the present invention when being focused on an infinite-distance object at the wide angle end. FIG. 5 is a longitudinal aberration diagram of Numerical embodiment 2 when being focused on an object with an object distance of 2 m at the wide angle end. The magnification-varying lens unit is completely identical to that of Embodiment 1 and the variation in aberrations due to zooming is also the same. Accordingly, aberration diagrams at the intermediate focal length and the telephoto end are omitted.

According to Numerical embodiment 2 corresponding to Embodiment 2, when the values, such as the focal length and the air equivalent interval, are substituted in the condition expressions (1) to (3), the values described in the fields of Embodiment 2 in Table 1 are acquired and all the condition expressions are satisfied. The condition expressions (1a), (2a) and (3a) are also satisfied in a more favorable numerical value range. Numerical embodiment thus shows that the zoom lens dedicated for 3D-image pickup that realizes a HD image quality, has a high magnification and is compact in size is realized.

Numerical embodiment 2 has a larger distance between the optical axes of right and left magnification-varying lens units than Numerical embodiment 1. According to Numerical embodiment 2, Dp=70 mm.

Embodiment 3

A 3D-image pickup optical system of Embodiment 3 of the present invention will hereinafter be described.

The configuration of the 3D-image pickup apparatus of this embodiment is completely identical to that of Embodiment 1.

Figure 6:
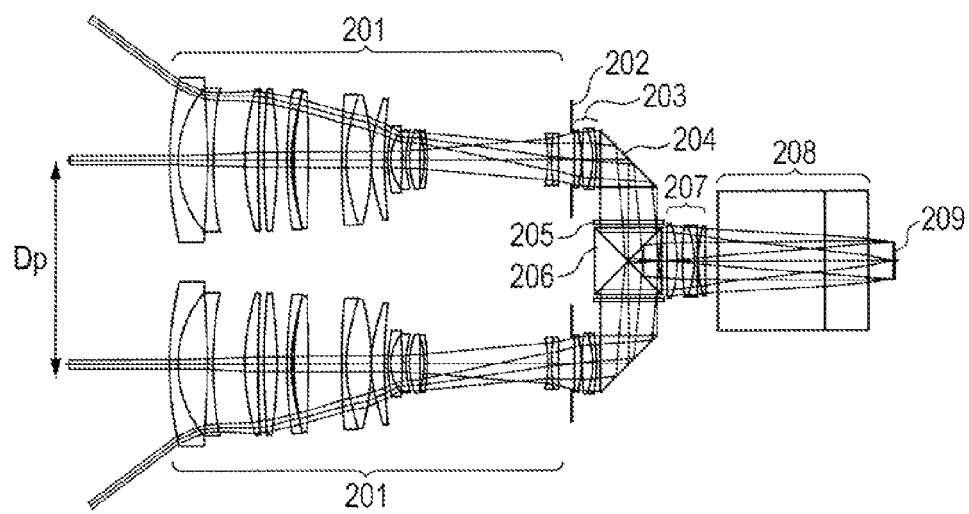
FIG. 6 is an optical path diagram of a 3D-image pickup optical system of Embodiment 3 focused at an infinite object distance at a wide angle end.
Figure 7:
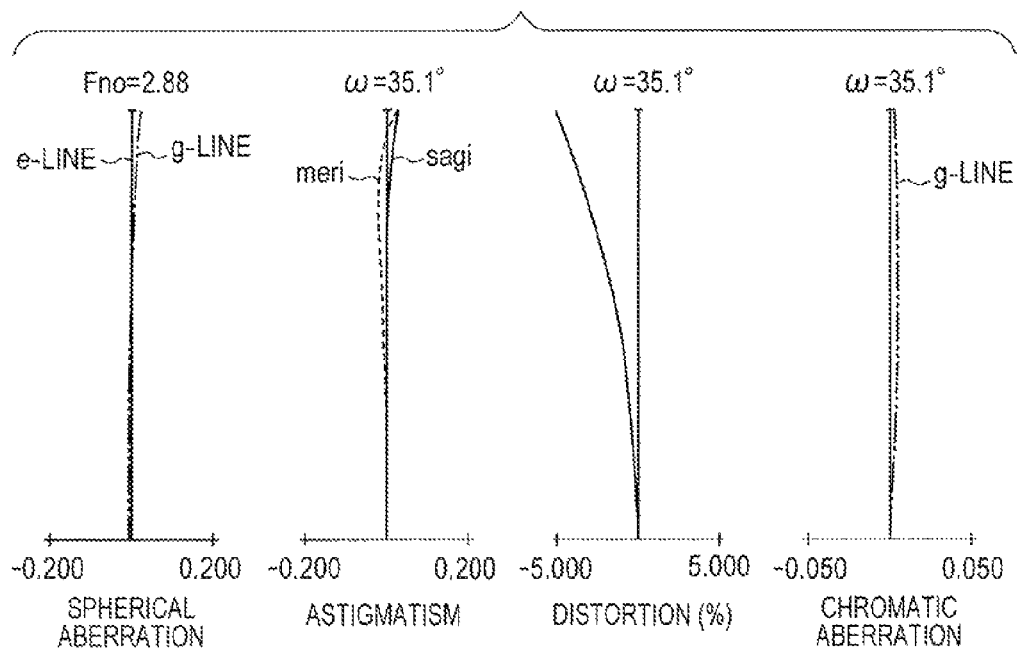
FIG. 7 is an aberration diagram of the 3D-image pickup optical system of Embodiment 3 when being focused at an object distance of 2 m at the wide angle end.

FIG. 6 is an optical path diagram of a lens system of Embodiment 3 (Numerical embodiment 3) of the present invention when being focused on an infinite-distance object at the wide angle end. FIG. 7 is a longitudinal aberration diagram of Numerical embodiment 3 when being focused on an object with an object distance of 2 m at the wide angle end. The magnification-varying lens unit is completely identical to that of Embodiment 1 and the variation in aberrations due to zooming is also the same. Accordingly, aberration diagrams at the intermediate focal length and the telephoto end are omitted.

According to Numerical embodiment 3 corresponding to Embodiment 3, when the values, such as of the focal length and the air equivalent interval, are substituted in the condition expressions (1) to (3), the values described in the fields of Embodiment 3 in Table 1 are acquired and all the condition examples are satisfied. The condition expressions (1a), (2a) and (3a) are also satisfied in a more favorable numerical value range. Numerical embodiment thus shows that the zoom lens dedicated for 3D-image pickup that realizes a HD image quality, has a high magnification and is compact in size is realized. Numerical embodiment 3 has a smaller distance between the optical axes of right and left magnification-varying lens units than Numerical embodiment 1. According to Numerical embodiment 3, Dp=61 mm.

Embodiment 4

A 3D-image pickup optical system of Embodiment 4 of the present invention will hereinafter be described.

Embodiment 4 of the present invention has the same apparatus configuration as that in each of Embodiments 1 to 3 except that one image pickup element is used and no color splitting optical system is included. Accordingly, detailed description is omitted.

In the case of an optical system employing one image pickup element, white shading due to a color splitting optical system is not required to be considered. Accordingly, in comparison with the case of optics using three image pickup elements, necessity for disposing the exit pupil position distant from the image plane is low.

The 3D-image pickup optical system having the above configuration satisfies a numerical value range defined by the following condition expression (4).

$$0.60 < e/Dp < 1.20 \quad (4)$$

Figure 8:
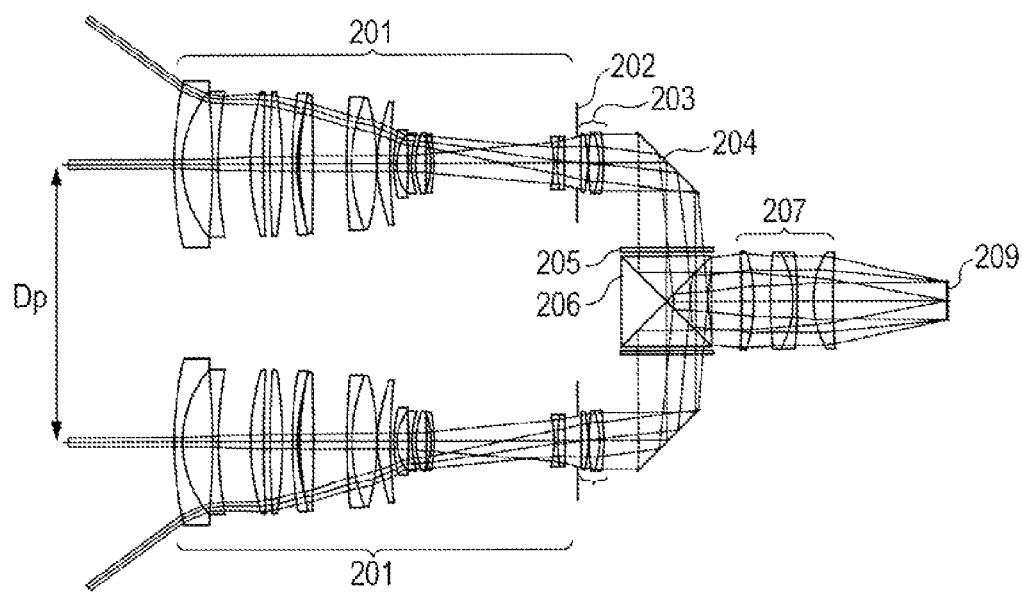
FIG. 8 is an optical path diagram of a 3D-image pickup optical system of Embodiment 4 when being focused at an infinite object distance at a wide angle end.

FIG. 8 is an optical path diagram of a lens system of Embodiment 4 (Numerical embodiment 4) of the present invention when being focused on an infinite-distance object at the wide angle end. In FIG. 8, it is defined such that Dp is the distance between the optical axes of right and left magnification-varying lens units 201, e is the air equivalent interval from the aperture stop 202 to the first surface of the second lens unit 207, d is one of the lens thickness and the lens interval in the optical axis direction, and nd is the refractive index for d-line of a medium filling each interval. The following equation holds.

$$e = \Sigma(d/nd)$$

If e is small with respect to the distance Dp between the optical axes and the lower limit condition of the condition expression (4) is not satisfied, it is difficult to secure a required back focus while maintaining a favorable optical performance. In contrast, if e is large with respect to the distance Dp between the optical axes and the upper limit condition of the condition expression (4) is not satisfied, the total length is increased and the diameter of the second lens unit 207 is increased. Accordingly, it becomes difficult to downsize the lens apparatus. A more suitable condition for the expression (4) is:

$$0.80 < e/Dp < 1.00 \quad (4a)$$

The 3D-image pickup optical system having the above configuration satisfies a numerical value range defined by the condition expression (5).

$$-0.10 < fw/fr < 0.30 \quad (5)$$

fr is the combined focal length of the first lens unit 203 and the second lens unit 207. The condition expression (5) defines the range of fr with respect to the focal length fw of the entire optical system at the wide angle end. If the focal length fw at the wide angle end is small with respect to the combined focal length fr and the lower limit condition of the condition expression (5) is not satisfied, it is difficult to secure the required back focus while maintaining a favorable optical performance. In contrast, the focal length fw at the wide angle end is large with respect to the combined focal length fr and the upper limit condition of the condition expression (5) is not satisfied, the total length is increased and the diameter of the second lens unit 207 is increased. Accordingly, it becomes difficult to downsize the lens apparatus. A more suitable condition for the expression (5) is:

$$-0.04 < fw/fr < 0.23 \quad (5a)$$

Figure 9:
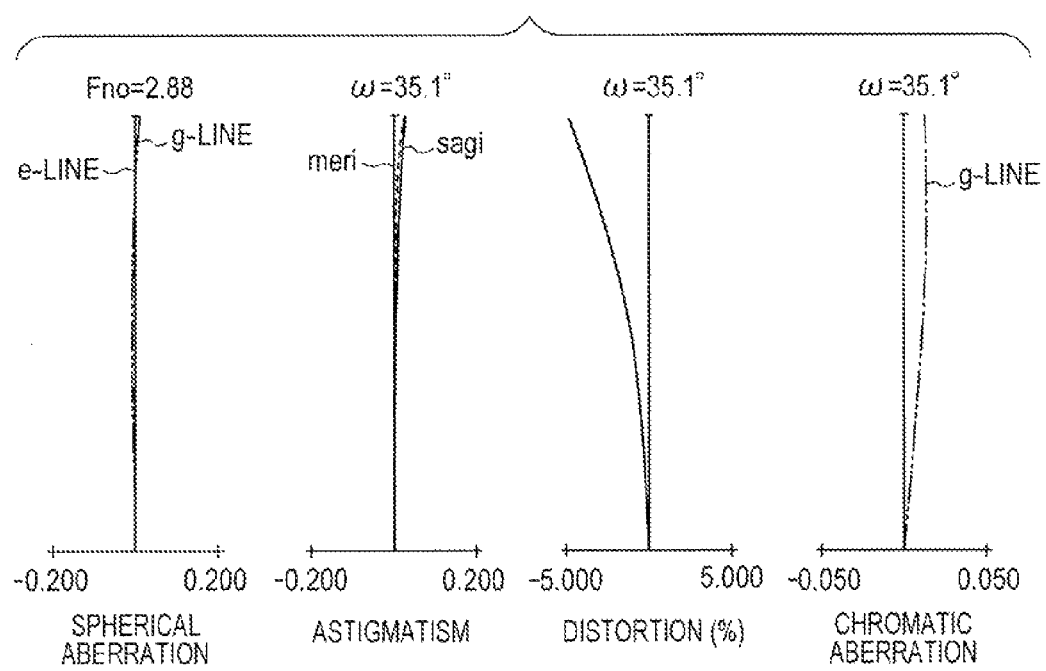
FIG. 9 is an aberration diagram of the 3D-image pickup optical system of Embodiment 4 when being focused at an object distance of 2 m at the wide angle end.

FIG. 9 is a longitudinal aberration diagram of Numerical embodiment 4 being focused on an object with an object distance of 2 m at the wide angle end. The magnification-varying lens unit is completely identical to that of Embodiment 1 and the variation in aberrations due to zooming is also the same. Accordingly, aberration diagrams at the intermediate focal length and the telephoto end are omitted.

According to Numerical embodiment 4 corresponding to Embodiment 4, when the values, such as of the focal length and the air equivalent interval, are substituted in the condition expressions (4) and (5), the values described in the fields of Embodiment 4 in Table 2 are acquired and the condition expressions are satisfied. The condition expressions (4a) and (5a) are also satisfied in a more favorable numerical value range. Numerical embodiment 4 thus shows that the zoom lens dedicated for 3D-image pickup that realizes HD image quality, has a high magnification and is compact in size is realized. The distance between the optical axes of right and left magnification-varying lens units according to Numerical embodiment 4 is Dp=82.6 mm.

Embodiment 5

A 3D-image pickup optical system of Embodiment 5 of the present invention will hereinafter be described.

The configuration of the 3D-image pickup apparatus of this embodiment is completely identical to that of Embodiment 4.

Figure 10:
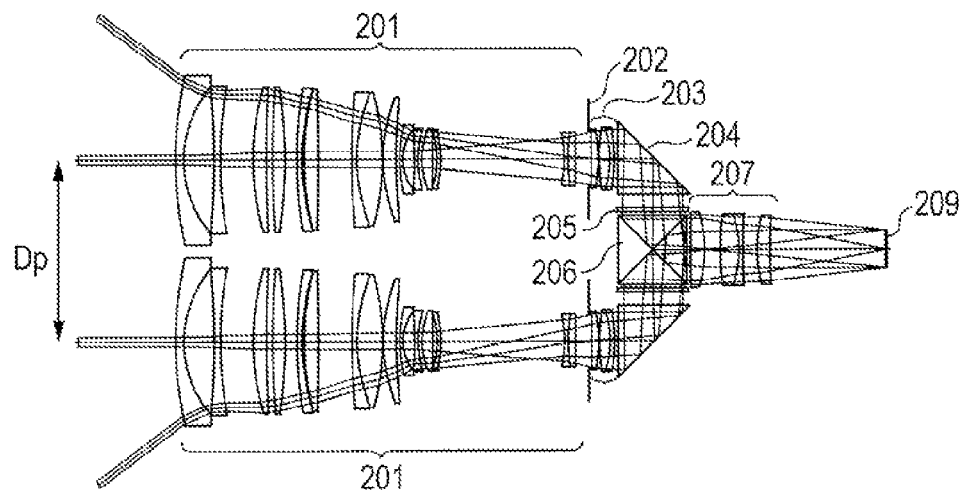
FIG. 10 is an optical path diagram of a 3D-image pickup optical system of Embodiment 5 when being focused at an infinite object distance at a wide angle end.
Figure 11:
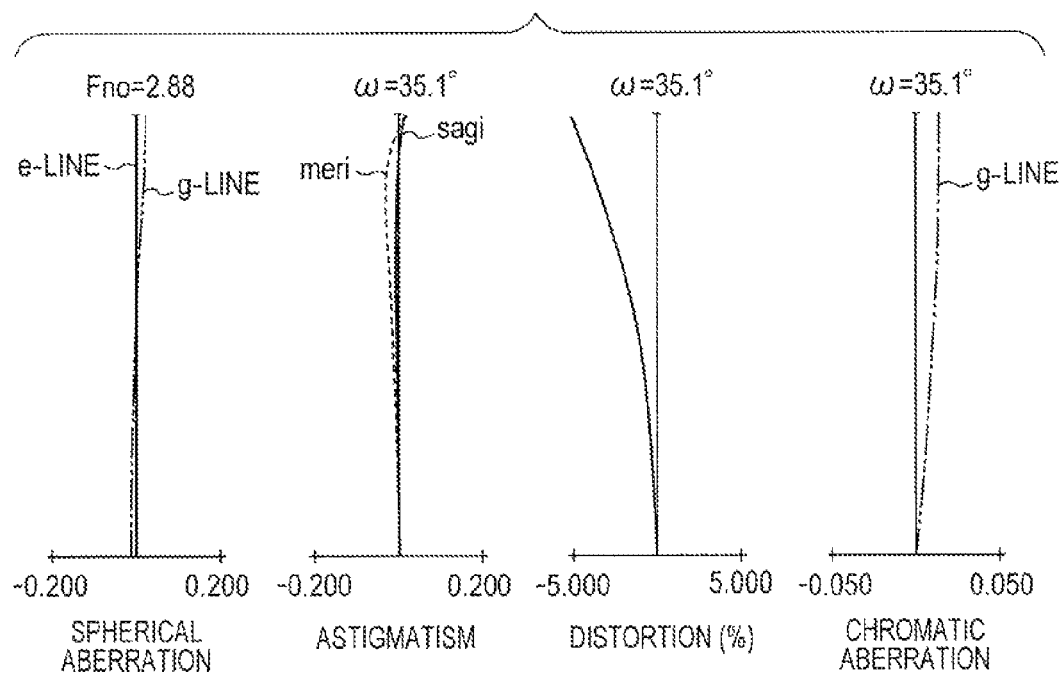
FIG. 11 is an aberration diagram of the 3D-image pickup optical system of Embodiment 5 when being focused at an object distance of 2 m at the wide angle end.

FIG. 10 is an optical path diagram of a lens system of Embodiment 5 (Numerical embodiment 5) of the present invention when being focused on an infinite-distance object at the wide angle end. FIG. 11 is a longitudinal aberration diagram of Numerical embodiment 5 when being focused on an object with an object distance of 2 m at the wide angle end. The magnification-varying lens unit is completely identical to that of Embodiment 1 and the variation in aberrations due to zooming is also the same. Accordingly, aberration diagrams at the intermediate focal length and the telephoto end are omitted.

According to Numerical embodiment 5 corresponding to Embodiment 5, when the values, such as of the focal length and the air equivalent interval, are substituted in the condition expressions (4) and (5), the values described in the fields of Embodiment 5 in Table 2 are acquired and all the condition expressions are satisfied. The condition expressions (4a) and (5a) are satisfied in a more favorable numerical value range. Numerical embodiment 5 thus shows that the zoom lens dedicated for 3D-image pickup that realizes HD image quality, has a high magnification and is compact in size is realized.

Numerical embodiment 5 has a smaller distance Dp between the optical axes of right and left magnification-varying lens units than Numerical embodiment 4. According to Numerical embodiment 5, Dp=52.7 mm.

The exemplary embodiments of the present invention have been described above. However, the present invention is not limited to these embodiments. Instead, the various modifications and changes can be made within the scope of the gist thereof.

Numerical embodiments 1 to 5 corresponding to Embodiments 1 to 5 will hereinafter be described.

Here, it is defined such that an X-axis is in the optical axis direction, an H-axis is in a direction perpendicular to the optical axis, the traveling direction of light is positive, R is a paraxial radius of curvature, k is the conic constant, $A3$, $A4$, $A5$, $A6$, $A7$, $A8$, $A9$, $A10$, $A11$ and $A12$ are aspherical coefficients. The aspherical shape is represented by the following expression.

$$X = \frac{H^2/R}{1 + \sqrt{1 - (1+k)(H/R)^2}} + A4H^4 + A6H^6 + A8H^8 + A10H^{10} + A12H^{12} + A3H^3 + A5H^5 + A7H^7 + A9H^9 + A11H^{11}$$

For instance, "e-Z" means "$\times 10^{-z}$". The symbol "*" after a surface number represents an aspherical surface. Table 1 shows correspondence between the embodiments and the aforementioned condition expressions.

Numerical Embodiment 1

| | | Surface data | | | |
|---|---|---|---|---|---|
| SURFACE NUMBER | r | d | nd | vd | EFFECTIVE DIAMETER |
| 1* | 117.056 | 2.20 | 1.88300 | 40.8 | 47.81 |
| 2 | 31.946 | 9.06 | | | 41.17 |
| 3 | −171.746 | 1.60 | 1.72916 | 54.7 | 41.04 |
| 4 | 105.485 | 9.44 | | | 40.47 |
| 5 | 74.301 | 3.83 | 1.78472 | 25.7 | 41.31 |
| 6 | 317.265 | 1.91 | | | 40.99 |
| 7 | 264.773 | 3.79 | 1.49700 | 81.5 | 41.00 |
| 8 | −144.020 | 2.84 | | | 41.06 |
| 9 | 117.356 | 1.50 | 1.84666 | 23.8 | 40.53 |
| 10 | 61.533 | 0.47 | | | 39.89 |
| 11 | 70.848 | 4.64 | 1.59240 | 68.3 | 39.89 |
| 12 | −696.250 | 9.59 | | | 39.75 |
| 13* | 191.986 | 1.50 | 1.76182 | 26.5 | 38.02 |
| 14 | 54.893 | 0.09 | | | 37.50 |
| 15 | 54.463 | 7.46 | 1.59240 | 68.3 | 37.55 |
| 16 | −71.343 | 0.20 | | | 37.43 |
| 17* | 48.139 | 3.70 | 1.77250 | 49.6 | 34.69 |
| 18 | 141.377 | (VARIABLE) | | | 33.79 |
| 19 | 36.419 | 0.80 | 1.88300 | 40.8 | 18.64 |
| 20 | 14.224 | 3.67 | | | 16.56 |
| 21 | −69.792 | 0.75 | 1.81600 | 46.6 | 16.27 |
| 22 | 26.160 | 1.22 | | | 15.83 |
| 23 | 23.051 | 3.14 | 1.80809 | 22.8 | 16.12 |
| 24 | −175.702 | 1.36 | | | 15.78 |
| 25 | −22.623 | 0.75 | 1.72916 | 54.7 | 15.72 |
| 26 | −44.141 | (VARIABLE) | | | 15.79 |
| 27 | −27.314 | 0.75 | 1.72916 | 54.7 | 13.30 |
| 28 | 36.648 | 2.40 | 1.80809 | 22.8 | 13.97 |
| 29 | 1341.336 | (VARIABLE) | | | 14.43 |
| 30 (STOP) | ∞ | 0.80 | | | 15.21 |
| 31 | −971.928 | 2.15 | 1.58913 | 61.1 | 15.59 |
| 32 | −32.888 | 0.20 | | | 15.97 |
| 33 | 63.157 | 3.21 | 1.56732 | 42.8 | 16.33 |
| 34 | −23.440 | 1.20 | 2.00069 | 25.5 | 16.37 |
| 35 | −46.472 | 1.00 | | | 16.73 |
| 36 | ∞ | 21.00 | 1.51633 | 64.1 | 21.00 |

-continued

| | | | | | |
|---|---|---|---|---|---|
| 37 | ∞ | 9.50 | | | 21.00 |
| 38 | ∞ | 1.00 | 1.51633 | 64.1 | 21.00 |
| 39 | ∞ | 1.00 | | | 21.00 |
| 40 | ∞ | 21.00 | 1.51633 | 64.1 | 21.00 |
| 41 | ∞ | 3.76 | | | 20.80 |
| 42 | 409.377 | 4.37 | 1.61772 | 49.8 | 21.70 |
| 43 | −37.644 | 3.28 | | | 22.01 |
| 44 | 99.866 | 3.68 | 1.49700 | 81.5 | 20.99 |
| 45 | −29.593 | 1.20 | 2.00330 | 28.3 | 20.75 |
| 46 | −229.259 | 0.20 | | | 20.89 |
| 47 | 39.589 | 2.48 | 1.48749 | 70.2 | 20.90 |
| 48 | 437.983 | 4.00 | | | 20.69 |
| 49 | ∞ | 33.00 | 1.60859 | 46.4 | 40.00 |
| 50 | ∞ | 13.20 | 1.51633 | 64.2 | 40.00 |
| 51 | ∞ | 8.00 | | | 40.00 |
| IMAGE PLANE | ∞ | | | | |

Aspherical surface data

1st surface $K = 4.00216e+000$   $A4 = 7.76469e-007$   $A6 = -1.30548e-009$
$A8 = 7.58224e-013$   $A10 = -1.04402e-016$   $A12 = -1.69476e-019$ 13th surface $K = 3.73863e+000$   $A4 = -6.86678e-008$   $A6 = 5.79669e-010$
$A8 = 4.85219e-013$   $A10 = -3.34626e-016$   $A12 = -1.61505e-018$ 17th surface $K = -5.72422e-001$   $A4 = 2.75546e-007$   $A6 = -2.32620e-010$
$A8 = -3.02986e-012$   $A10 = 2.28464e-015$   $A12 = 9.78442e-019$ Various data Zoom ratio    6.70

| | WIDE-ANGLE | INTERMEDIATE | TELEPHOTO |
|---|---|---|---|
| FOCAL LENGTH | 7.83 | 23.49 | 52.46 |
| F-NUMBER | 2.88 | 2.88 | 2.89 |
| ANGLE OF VIEW | 35.09 | 13.18 | 5.99 |
| IMAGE HEIGHT | 5.50 | 5.50 | 5.50 |
| TOTAL LENS LENGTH | 259.27 | 259.27 | 259.27 |
| BF | 8.00 | 8.00 | 8.00 |
| d18 | 1.01 | 25.73 | 36.21 |
| d26 | 36.62 | 9.56 | 3.60 |
| d29 | 3.75 | 6.10 | 1.57 |
| INCIDENT PUPIL POSITION | 32.73 | 58.51 | 87.84 |
| EXIT PUPIL POSITION | 476.40 | 476.40 | 476.40 |
| FRONT PRINCIPAL POINT POSITION | 40.69 | 83.18 | 146.17 |
| REAR PRINCIPAL POINT POSITION | 0.17 | −15.49 | −44.46 |

Zoom lens unit data

| UNIT | START SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 35.00 | 63.82 | 40.47 | 25.62 |
| 2 | 19 | −17.48 | 11.69 | 1.81 | −7.18 |
| 3 | 27 | −39.80 | 3.15 | 0.00 | −1.75 |
| 4 | 30 | 49.76 | 131.23 | 54.36 | −111.86 |

Numerical Embodiment 2

Surface data

| SURFACE NUMBER | r | d | nd | vd | EFFECTIVE DIAMETER |
|---|---|---|---|---|---|
| 1* | 117.056 | 2.20 | 1.88300 | 40.8 | 47.81 |
| 2 | 31.946 | 9.06 | | | 41.17 |
| 3 | −171.746 | 1.60 | 1.72916 | 54.7 | 41.04 |
| 4 | 105.485 | 9.44 | | | 40.47 |

-continued

| | | | | | |
|---|---|---|---|---|---|
| 5 | 74.301 | 3.83 | 1.78472 | 25.7 | 41.31 |
| 6 | 317.265 | 1.91 | | | 40.99 |
| 7 | 264.773 | 3.79 | 1.49700 | 81.5 | 40.99 |
| 8 | −144.020 | 2.84 | | | 41.18 |
| 9 | 117.356 | 1.50 | 1.84666 | 23.8 | 41.40 |
| 10 | 61.533 | 0.47 | | | 40.94 |
| 11 | 70.848 | 4.64 | 1.59240 | 68.3 | 40.94 |
| 12 | −696.250 | 9.59 | | | 40.92 |
| 13* | 191.986 | 1.50 | 1.76182 | 26.5 | 41.55 |
| 14 | 54.893 | 0.09 | | | 41.27 |
| 15 | 54.463 | 7.46 | 1.59240 | 68.3 | 41.34 |
| 16 | −71.343 | 0.20 | | | 41.35 |
| 17* | 48.139 | 3.70 | 1.77250 | 49.6 | 38.78 |
| 18 | 141.377 | (VARIABLE) | | | 38.21 |
| 19 | 36.419 | 0.80 | 1.88300 | 40.8 | 18.64 |
| 20 | 14.224 | 3.67 | | | 16.56 |
| 21 | −69.792 | 0.75 | 1.81600 | 46.6 | 16.27 |
| 22 | 26.160 | 1.22 | | | 15.83 |
| 23 | 23.051 | 3.14 | 1.80809 | 22.8 | 16.12 |
| 24 | −175.702 | 1.36 | | | 15.78 |
| 25 | −22.623 | 0.75 | 1.72916 | 54.7 | 15.72 |
| 26 | −44.141 | (VARIABLE) | | | 15.79 |
| 27 | −27.314 | 0.75 | 1.72916 | 54.7 | 13.30 |
| 28 | 36.648 | 2.40 | 1.80809 | 22.8 | 13.97 |
| 29 | 1341.336 | (VARIABLE) | | | 14.43 |
| 30 (STOP) | ∞ | 0.80 | | | 15.21 |
| 31 | −305.963 | 2.31 | 1.58913 | 61.1 | 15.56 |
| 32 | −26.875 | 0.20 | | | 15.95 |
| 33 | 54.618 | 3.09 | 1.56732 | 42.8 | 16.28 |
| 34 | −26.577 | 1.20 | 2.00069 | 25.5 | 16.27 |
| 35 | −65.537 | 2.83 | | | 16.53 |
| 36 | ∞ | 25.00 | 1.51633 | 64.1 | 25.00 |
| 37 | ∞ | 8.00 | | | 25.00 |
| 38 | ∞ | 1.00 | 1.51633 | 64.1 | 25.00 |
| 39 | ∞ | 1.00 | | | 25.00 |
| 40 | ∞ | 25.00 | 1.51633 | 64.1 | 25.00 |
| 41 | ∞ | 8.99 | | | 22.11 |
| 42 | −57.866 | 2.35 | 1.61772 | 49.8 | 23.91 |
| 43 | −31.369 | 5.00 | | | 24.26 |
| 44 | 126.281 | 6.31 | 1.49700 | 81.5 | 24.12 |
| 45 | −27.855 | 1.20 | 2.00330 | 28.3 | 23.89 |
| 46 | −73.730 | 3.17 | | | 24.42 |
| 47 | 34.358 | 3.38 | 1.48749 | 70.2 | 24.62 |
| 48 | 784.646 | 4.00 | | | 24.35 |
| 49 | ∞ | 33.00 | 1.60859 | 46.4 | 40.00 |
| 50 | ∞ | 13.20 | 1.51633 | 64.2 | 40.00 |
| 51 | ∞ | 8.00 | | | 40.00 |
| IMAGE PLANE | ∞ | | | | |

Aspherical surface data

1st surface $K = 4.00216e+000$    $A4 = 7.76469e-007$    $A6 = -1.30548e-009$
$A8 = 7.58224e-013$    $A10 = -1.04402e-016$    $A12 = -1.69476e-019$ 13th surface $K = 3.73863e+000$    $A4 = -6.86678e-008$    $A6 = 5.79669e-010$
$A8 = 4.85219e-013$    $A10 = -3.34626e-016$    $A12 = -1.61505e-018$ 17th surface $K = -5.72422e-001$    $A4 = 2.75546e-007$    $A6 = -2.32620e-010$
$A8 = -3.02986e-012$    $A10 = 2.28464e-015$    $A12 = 9.78442e-019$ Various data

| Zoom ratio | | 6.70 | |
|---|---|---|---|
| | WIDE-ANGLE | INTERMEDIATE | TELEPHOTO |
| FOCAL LENGTH | 7.83 | 23.49 | 52.46 |
| F-NUMBER | 2.88 | 2.88 | 2.89 |
| ANGLE OF VIEW | 35.09 | 13.18 | 5.99 |
| IMAGE HEIGHT | 5.50 | 5.50 | 5.50 |
| TOTAL LENS LENGTH | 279.07 | 279.07 | 279.07 |
| BF | 8.00 | 8.00 | 8.00 |
| d18 | 1.01 | 25.73 | 36.21 |
| d26 | 36.62 | 9.56 | 3.60 |
| d29 | 3.75 | 6.10 | 1.57 |

|  |  |  |  |
|---|---|---|---|
| INCIDENT PUPIL POSITION | 32.73 | 58.51 | 87.84 |
| EXIT PUPIL POSITION | 109.95 | 109.95 | 109.95 |
| FRONT PRINCIPAL POINT POSITION | 41.16 | 87.41 | 167.29 |
| REAR PRINCIPAL POINT POSITION | 0.17 | −15.49 | −44.46 |

Zoom lens unit data

| UNIT | START SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 35.00 | 63.82 | 40.47 | 25.62 |
| 2 | 19 | −17.48 | 11.69 | 1.81 | −7.18 |
| 3 | 27 | −39.80 | 3.15 | 0.00 | −1.75 |
| 4 | 30 | 107.68 | 151.03 | 153.40 | −251.39 |

Numerical Embodiment 3

Surface data

| SURFACE NUMBER | r | d | nd | vd | EFFECTIVE DIAMETER |
|---|---|---|---|---|---|
| 1* | 117.056 | 2.20 | 1.88300 | 40.8 | 47.81 |
| 2 | 31.946 | 9.06 |  |  | 41.17 |
| 3 | −171.746 | 1.60 | 1.72916 | 54.7 | 41.04 |
| 4 | 105.485 | 9.44 |  |  | 40.47 |
| 5 | 74.301 | 3.83 | 1.78472 | 25.7 | 41.31 |
| 6 | 317.265 | 1.91 |  |  | 40.99 |
| 7 | 264.773 | 3.79 | 1.49700 | 81.5 | 40.99 |
| 8 | −144.020 | 2.84 |  |  | 41.18 |
| 9 | 117.356 | 1.50 | 1.84666 | 23.8 | 41.40 |
| 10 | 61.533 | 0.47 |  |  | 40.94 |
| 11 | 70.848 | 4.64 | 1.59240 | 68.3 | 40.94 |
| 12 | −696.250 | 9.59 |  |  | 40.92 |
| 13* | 191.986 | 1.50 | 1.76182 | 26.5 | 41.55 |
| 14 | 54.893 | 0.09 |  |  | 41.27 |
| 15 | 54.463 | 7.46 | 1.59240 | 68.3 | 41.34 |
| 16 | −71.343 | 0.20 |  |  | 41.35 |
| 17* | 48.139 | 3.70 | 1.77250 | 49.6 | 38.78 |
| 18 | 141.377 | (VARIABLE) |  |  | 38.21 |
| 19 | 36.419 | 0.80 | 1.88300 | 40.8 | 18.64 |
| 20 | 14.224 | 3.67 |  |  | 16.56 |
| 21 | −69.792 | 0.75 | 1.81600 | 46.6 | 16.27 |
| 22 | 26.160 | 1.22 |  |  | 15.83 |
| 23 | 23.051 | 3.14 | 1.80809 | 22.8 | 16.12 |
| 24 | −175.702 | 1.36 |  |  | 15.78 |
| 25 | −22.623 | 0.75 | 1.72916 | 54.7 | 15.72 |
| 26 | −44.141 | (VARIABLE) |  |  | 15.79 |
| 27 | −27.314 | 0.75 | 1.72916 | 54.7 | 13.30 |
| 28 | 36.648 | 2.40 | 1.80809 | 22.8 | 13.97 |
| 29 | 1341.336 | (VARIABLE) |  |  | 14.43 |
| 30 (STOP) | ∞ | 0.80 |  |  | 15.21 |
| 31 | −240.551 | 2.01 | 1.58913 | 61.1 | 15.54 |
| 32 | −34.190 | 0.20 |  |  | 15.94 |
| 33 | 50.859 | 3.41 | 1.56732 | 42.8 | 16.40 |
| 34 | −22.716 | 1.20 | 2.00069 | 25.5 | 16.44 |
| 35 | −44.188 | 1.00 |  |  | 16.82 |
| 36 | ∞ | 17.00 | 1.51633 | 64.1 | 17.00 |
| 37 | ∞ | 10.00 |  |  | 17.00 |
| 38 | ∞ | 1.00 | 1.51633 | 64.1 | 20.00 |
| 39 | ∞ | 1.00 |  |  | 20.00 |
| 40 | ∞ | 20.00 | 1.51633 | 64.1 | 20.00 |
| 41 | ∞ | 1.39 |  |  | 20.01 |
| 42 | 178.351 | 2.97 | 1.61772 | 49.8 | 20.39 |
| 43 | −37.981 | 1.50 |  |  | 20.51 |
| 44 | 52.601 | 3.67 | 1.49700 | 81.5 | 19.74 |
| 45 | −32.556 | 1.20 | 2.00330 | 28.3 | 19.41 |
| 46 | −4912.123 | 0.20 |  |  | 19.34 |
| 47 | 50.669 | 1.86 | 1.48749 | 70.2 | 19.27 |
| 48 | 175.747 | 4.00 |  |  | 19.07 |
| 49 | ∞ | 33.00 | 1.60859 | 46.4 | 40.00 |

-continued

| | | | | | |
|---|---|---|---|---|---|
| 50 | ∞ | 13.20 | 1.51633 | 64.2 | 40.00 |
| 51 | ∞ | 8.00 | | | 40.00 |
| IMAGE PLANE | ∞ | | | | |

Aspherical surface data

1st surface

K = 4.00216e+000          A4 = 7.76469e−007          A6 = −1.30548e−009
A8 = 7.58224e−013         A10 = −1.04402e−016        A12 = −1.69476e−019

13th surface

K = 3.73863e+000          A4 = −6.86678e−008         A6 = 5.79669e−010
A8 = 4.85219e−013         A10 = −3.34626e−016        A12 = −1.61505e−018

17th surface

K = −5.72422e−001         A4 = 2.75546e−007          A6 = −2.32620e−010
A8 = −3.02986e−012        A10 = 2.28464e−015         A12 = 9.78442e−019

Various data

Zoom ratio          6.70

| | WIDE-ANGLE | INTERMEDIATE | TELEPHOTO |
|---|---|---|---|
| FOCAL LENGTH | 7.83 | 23.49 | 52.46 |
| F-NUMBER | 2.88 | 2.88 | 2.89 |
| ANGLE OF VIEW | 35.09 | 13.18 | 5.99 |
| IMAGE HEIGHT | 5.50 | 5.50 | 5.50 |
| TOTAL LENS LENGTH | 248.65 | 248.65 | 248.65 |
| BF | 8.00 | 8.00 | 8.00 |
| d18 | 1.01 | 25.73 | 36.21 |
| d26 | 36.62 | 9.56 | 3.60 |
| d29 | 3.75 | 6.10 | 1.57 |
| INCIDENT PUPIL POSITION | 32.73 | 58.51 | 87.84 |
| EXIT PUPIL POSITION | −767.52 | −767.52 | −767.52 |
| FRONT PRINCIPAL POINT POSITION | 40.48 | 81.29 | 136.75 |
| REAR PRINCIPAL POINT POSITION | 0.17 | −15.49 | −44.46 |

Zoom lens unit data

| UNIT | START SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 35.00 | 63.82 | 40.47 | 25.62 |
| 2 | 19 | −17.48 | 11.69 | 1.81 | −7.18 |
| 3 | 27 | −39.80 | 3.15 | 0.00 | −1.75 |
| 4 | 30 | 40.13 | 120.61 | 37.89 | −88.66 |

Numerical Embodiment 4

Surface data

| SURFACE NUMBER | r | d | nd | vd | EFFECTIVE DIAMETER |
|---|---|---|---|---|---|
| 1* | 117.056 | 2.20 | 1.88300 | 40.8 | 47.79 |
| 2 | 31.946 | 9.06 | | | 41.15 |
| 3 | −171.746 | 1.60 | 1.72916 | 54.7 | 41.03 |
| 4 | 105.485 | 9.44 | | | 40.46 |
| 5 | 74.301 | 3.83 | 1.78472 | 25.7 | 41.30 |
| 6 | 317.265 | 1.91 | | | 40.97 |
| 7 | 264.773 | 3.79 | 1.49700 | 81.5 | 40.98 |
| 8 | −144.020 | 2.84 | | | 41.16 |
| 9 | 117.356 | 1.50 | 1.84666 | 23.8 | 41.39 |
| 10 | 61.533 | 0.47 | | | 40.93 |
| 11 | 70.848 | 4.64 | 1.59240 | 68.3 | 40.92 |
| 12 | −696.250 | 9.59 | | | 40.90 |
| 13* | 191.986 | 1.50 | 1.76182 | 26.5 | 41.54 |
| 14 | 54.893 | 0.09 | | | 41.25 |
| 15 | 54.463 | 7.46 | 1.59240 | 68.3 | 41.33 |
| 16 | −71.343 | 0.20 | | | 41.33 |
| 17* | 48.139 | 3.70 | 1.77250 | 49.6 | 38.77 |

-continued

| | | | | | |
|---|---|---|---|---|---|
| 18 | 141.377 | (VARIABLE) | | | 38.20 |
| 19 | 36.419 | 0.80 | 1.88300 | 40.8 | 18.64 |
| 20 | 14.224 | 3.67 | | | 16.55 |
| 21 | −69.792 | 0.75 | 1.81600 | 46.6 | 16.26 |
| 22 | 26.160 | 1.22 | | | 15.83 |
| 23 | 23.051 | 3.14 | 1.80809 | 22.8 | 16.12 |
| 24 | −175.702 | 1.36 | | | 15.78 |
| 25 | −22.623 | 0.75 | 1.72916 | 54.7 | 15.72 |
| 26 | −44.141 | (VARIABLE) | | | 15.79 |
| 27 | −27.314 | 0.75 | 1.72916 | 54.7 | 13.30 |
| 28 | 36.648 | 2.40 | 1.80809 | 22.8 | 13.97 |
| 29 | 1341.336 | (VARIABLE) | | | 14.43 |
| 30 (STOP) | ∞ | 0.80 | | | 15.21 |
| 31 | 200.685 | 2.65 | 1.58913 | 61.1 | 15.68 |
| 32 | −25.476 | 0.20 | | | 16.02 |
| 33 | 157.024 | 2.99 | 1.56732 | 42.8 | 16.12 |
| 34 | −21.322 | 1.20 | 2.00069 | 25.5 | 16.12 |
| 35 | −49.309 | 44.80 | | | 16.48 |
| 36 | ∞ | 1.00 | 1.51633 | 64.1 | 27.00 |
| 37 | ∞ | 1.00 | | | 27.00 |
| 38 | ∞ | 27.00 | 1.51633 | 64.1 | 27.00 |
| 39 | ∞ | 8.64 | | | 26.55 |
| 40 | −690.588 | 3.91 | 1.61772 | 49.8 | 28.52 |
| 41 | −39.838 | 5.00 | | | 28.74 |
| 42 | 170.261 | 6.78 | 1.49700 | 81.5 | 26.89 |
| 43 | −29.435 | 1.20 | 2.00330 | 28.3 | 26.25 |
| 44 | −126.481 | 5.00 | | | 26.63 |
| 45 | 28.288 | 5.71 | 1.48749 | 70.2 | 26.62 |
| 46 | 144.373 | 35.23 | | | 25.61 |
| IMAGE PLANE | ∞ | | | | |

Aspherical surface data

1st surface

K = 4.00216e+000   A4 = 7.76469e−007   A6 = −1.30548e−009
A8 = 7.58224e−013   A10 = −1.04402e−016   A12 = −1.69476e−019

13th surface

K = 3.73863e+000   A4 = −6.86678e−008   A6 = 5.79669e−010
A8 = 4.85219e−013   A10 = −3.34626e−016   A12 = −1.61505e−018

17th surface

K = −5.72422e−001   A4 = 2.75546e−007   A6 = −2.32620e−010
A8 = −3.02986e−012   A10 = 2.28464e−015   A12 = 9.78442e−019

Various data

Zoom ratio       6.70

| | WIDE-ANGLE | INTERMEDIATE | TELEPHOTO |
|---|---|---|---|
| FOCAL LENGTH | 7.83 | 23.49 | 52.46 |
| F-NUMBER | 2.88 | 2.88 | 2.89 |
| ANGLE OF VIEW | 35.09 | 13.18 | 5.99 |
| IMAGE HEIGHT | 5.50 | 5.50 | 5.50 |
| TOTAL LENS LENGTH | 273.15 | 273.15 | 273.15 |
| d18 | 1.01 | 25.73 | 36.21 |
| d26 | 36.62 | 9.56 | 3.60 |
| d29 | 3.75 | 6.10 | 1.57 |
| INCIDENT PUPIL POSITION | 32.73 | 58.51 | 87.84 |
| EXIT PUPIL POSITION | 92.60 | 92.60 | 92.60 |
| FRONT PRINCIPAL POINT POSITION | 41.63 | 91.62 | 188.27 |
| REAR PRINCIPAL POINT POSITION | 27.40 | 11.74 | −17.23 |

Zoom lens unit data

| UNIT | START SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 35.00 | 63.82 | 40.47 | 25.62 |
| 2 | 19 | −17.48 | 11.69 | 1.81 | −7.18 |
| 3 | 27 | −39.80 | 3.15 | 0.00 | −1.75 |
| 4 | 30 | −688.09 | 117.88 | −1207.23 | 1692.70 |

Numerical Embodiment 5

Surface data

| SURFACE NUMBER | r | d | nd | vd | EFFECTIVE DIAMETER |
|---|---|---|---|---|---|
| 1* | 117.056 | 2.20 | 1.88300 | 40.8 | 47.90 |
| 2 | 31.946 | 9.06 | | | 41.23 |
| 3 | −171.746 | 1.60 | 1.72916 | 54.7 | 41.12 |
| 4 | 105.485 | 9.44 | | | 40.55 |
| 5 | 74.301 | 3.83 | 1.78472 | 25.7 | 41.39 |
| 6 | 317.265 | 1.91 | | | 41.07 |
| 7 | 264.773 | 3.79 | 1.49700 | 81.5 | 41.07 |
| 8 | −144.020 | 2.84 | | | 41.25 |
| 9 | 117.356 | 1.50 | 1.84666 | 23.8 | 41.48 |
| 10 | 61.533 | 0.47 | | | 41.02 |
| 11 | 70.848 | 4.64 | 1.59240 | 68.3 | 41.01 |
| 12 | −696.250 | 9.59 | | | 40.99 |
| 13* | 191.986 | 1.50 | 1.76182 | 26.5 | 41.60 |
| 14 | 54.893 | 0.09 | | | 41.32 |
| 15 | 54.463 | 7.46 | 1.59240 | 68.3 | 41.40 |
| 16 | −71.343 | 0.20 | | | 41.40 |
| 17* | 48.139 | 3.70 | 1.77250 | 49.6 | 38.83 |
| 18 | 141.377 | (VARIABLE) | | | 38.26 |
| 19 | 36.419 | 0.80 | 1.88300 | 40.8 | 18.67 |
| 20 | 14.224 | 3.67 | | | 16.58 |
| 21 | −69.792 | 0.75 | 1.81600 | 46.6 | 16.29 |
| 22 | 26.160 | 1.22 | | | 15.85 |
| 23 | 23.051 | 3.14 | 1.80809 | 22.8 | 16.14 |
| 24 | −175.702 | 1.36 | | | 15.80 |
| 25 | −22.623 | 0.75 | 1.72916 | 54.7 | 15.74 |
| 26 | −44.141 | (VARIABLE) | | | 15.81 |
| 27 | −27.314 | 0.75 | 1.72916 | 54.7 | 13.30 |
| 28 | 36.648 | 2.40 | 1.80809 | 22.8 | 13.97 |
| 29 | 1341.336 | (VARIABLE) | | | 14.43 |
| 30 (STOP) | ∞ | 0.80 | | | 15.21 |
| 31 | −241.271 | 2.05 | 1.58913 | 61.1 | 15.54 |
| 32 | −32.795 | 0.20 | | | 15.94 |
| 33 | −48.829 | 3.53 | 1.56732 | 42.8 | 16.39 |
| 34 | −21.618 | 1.20 | 2.00069 | 25.5 | 16.42 |
| 35 | −47.876 | 1.01 | | | 16.83 |
| 36 | ∞ | 20.00 | 1.51633 | 64.1 | 20.00 |
| 37 | ∞ | 4.37 | | | 20.00 |
| 38 | ∞ | 1.00 | 1.51633 | 64.1 | 20.00 |
| 39 | ∞ | 1.00 | | | 20.00 |
| 40 | ∞ | 20.00 | 1.51633 | 64.1 | 20.00 |
| 41 | ∞ | 1.01 | | | 19.84 |
| 42 | 154.479 | 4.05 | 1.61772 | 49.8 | 20.16 |
| 43 | −38.700 | 5.00 | | | 20.40 |
| 44 | 47.960 | 5.49 | 1.49700 | 81.5 | 19.07 |
| 45 | −30.052 | 1.20 | 2.00330 | 28.3 | 18.28 |
| 46 | 395.519 | 4.09 | | | 18.22 |
| 47 | 38.801 | 3.90 | 1.48749 | 70.2 | 18.23 |
| 48 | 230.088 | 34.83 | | | 17.77 |
| IMAGE PLANE | ∞ | | | | |

Aspherical surface data

1st surface $K = 4.00216e+000$  $A4 = 7.76469e-007$  $A6 = -1.30548e-009$
$A8 = 7.58224e-013$  $A10 = -1.04402e-016$  $A12 = -1.69476e-019$ 13th surface $K = 3.73863e+000$  $A4 = -6.86678e-008$  $A6 = 5.79669e-010$
$A8 = 4.85219e-013$  $A10 = -3.34626e-016$  $A12 = -1.61505e-018$ 17th surface $K = -5.72422e-001$  $A4 = 2.75546e-007$  $A6 = -2.32620e-010$
$A8 = -3.02986e-012$  $A10 = 2.28464e-015$  $A12 = 9.78442e-019$

Various data

| Zoom ratio | 6.70 | | |
|---|---|---|---|
| | WIDE-ANGLE | INTERMEDIATE | TELEPHOTO |
| FOCAL LENGTH | 7.83 | 23.49 | 52.46 |
| F-NUMBER | 2.88 | 2.88 | 2.89 |

-continued

| | | | |
|---|---|---|---|
| ANGLE OF VIEW | 35.09 | 13.18 | 5.99 |
| IMAGE HEIGHT | 5.50 | 5.50 | 5.50 |
| TOTAL LENS LENGTH | 234.78 | 234.78 | 234.78 |
| BF | 34.83 | 34.83 | 34.83 |
| d18 | 1.01 | 25.73 | 36.21 |
| d26 | 36.62 | 9.56 | 3.60 |
| d29 | 3.75 | 6.10 | 1.57 |
| INCIDENT PUPIL POSITION | 32.73 | 58.51 | 87.84 |
| EXIT PUPIL POSITION | −552.34 | −552.34 | −552.34 |
| FRONT PRINCIPAL POINT POSITION | 40.46 | 81.06 | 135.61 |
| REAR PRINCIPAL POINT POSITION | 27.00 | 11.34 | −17.63 |

Zoom lens unit data

| UNIT | START SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 35.00 | 63.82 | 40.47 | 25.62 |
| 2 | 19 | −17.48 | 11.69 | 1.81 | −7.18 |
| 3 | 27 | −39.80 | 3.15 | 0.00 | −1.75 |
| 4 | 30 | 39.21 | 79.90 | 36.32 | −59.62 |

TABLE 1

| | EMBODIMENT 1 | EMBODIMENT 2 | EMBODIMENT 3 |
|---|---|---|---|
| CONDITION EXPRESSION (1) | 0.004 | 0.033 | −0.015 |
| CONDITION EXPRESSION (2) | 1.51633 | 1.516133 | 1.51633 |
| CONDITION EXPRESSION (3) | 0.16 | 0.07 | 0.20 |

TABLE 2

| | EMBODIMENT 4 | EMBODIMENT 5 |
|---|---|---|
| CONDITION EXPRESSION (4) | 0.94 | 0.75 |
| CONDITION EXPRESSION (5) | −0.01 | 0.20 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-095575, filed Apr. 19, 2012, which is hereby incorporated by reference herein in its entirety.

What is claimed is:

1. A 3D-image pickup optical system comprising:
a pair of optical systems each including a magnification-varying lens unit, an aperture stop, a first lens unit, and a first reflective member in a sequential order from an object side toward an image side, the optical systems having optical axes offset from each other;
a second lens unit that is fixed and receives object light fluxes from the pair of optical systems;
a second reflective member that guides the object light fluxes from the pair of optical systems to the second lens unit; and
a switching unit that is disposed in an object side of the second reflective member, and alternately guides the pair of the object light fluxes respectively from the pair of optical systems to the second reflective member, wherein:

$-0.050 < fw \times (-1/e + 1/fr2) < 0.080;$ and $e = \Sigma(d/nd)$ are satisfied, where d is one of a lens thickness or a lens interval in an optical axis direction, nd is a refractive index for d-line of a medium filling one of the lens thickness or the lens interval, fw is a focal length of an entire system at a wide angle end, fr2 is a focal length of the second lens unit, and e represents an air equivalent interval between the aperture stop and a surface on the most object side of the second lens unit.

2. The 3D-image pickup optical system, according to claim 1, wherein:

$1.4 < ndp$ is satisfied, where at least one of the first reflective member or the second reflective member is a prism, and ndp is a refractive index of the prism for d-line.

3. The 3D-image pickup optical system, according to claim 1, wherein:

$-0.10 < fw/fr < 0.30$ is satisfied, where fr is a combined focal length of the first lens unit and the second lens unit.

4. The 3D-image pickup optical system, according to claim 1, wherein:

$0.60 < e/Dp < 1.20$ is satisfied, where Dp is a distance between optical axes of the pair of magnification-varying lens units.

5. The 3D-image pickup optical system, according to claim 1, further comprising:

a driving unit that drives at least one pair of lenses in a pair of the first lens units in a plane perpendicular to an optical axis; and a controller that controls the driving unit to drive at least the one pair of lenses in the pair of the first lens units in the plane perpendicular to the optical axis by a same amount in directions opposite to each other in a plane including optical axes of the pair of the magnification-varying lens units.

6. A 3D-image pickup apparatus comprising:
a first image pickup element; and
a 3D-image pickup optical system configured to guide a light from an object to the first image pickup element,
wherein the 3D-image pickup optical system comprises:
    a pair of optical systems each including a magnification-varying lens unit, an aperture stop, a first lens unit, and a first reflective member in a sequential order from an object side toward an image side, the optical systems having optical axes offset from each other;
    a second lens unit that is fixed and receives object light fluxes from the pair of optical systems;
    a second reflective member that guides the object light fluxes from the pair of optical systems to the second lens unit; and
    a switching unit that is disposed in an object side of the second reflective member, and alternately guides the pair of the object light fluxes respectively from the pair of optical systems to the second reflective member,
wherein:

$$-0.050 < fw \times (-1/e + 1/fr2) < 0.080;$$

and $$e = \Sigma(d/nd)$$

are satisfied, where d is one of a lens thickness or a lens interval in an optical axis direction, nd is a refractive index for d-line of a medium filling one of the lens thickness or the lens interval, fw is a focal length of an entire system at a wide angle end, fr2 is a focal length of the second lens unit, and e represents an air equivalent interval between the aperture stop and a surface on the most object side of the second lens unit.

7. The 3D-image pickup apparatus according to claim 6, further comprising:
a second image pickup element;
a third image pickup element; and
a splitting optical system configured to guide light from the 3D-image pickup optical system to each of the first, second, and third image pickup elements.

8. A 3D-image pickup optical system comprising:
a pair of optical systems each including a magnification-varying lens unit, an aperture stop, a first lens unit, and a first reflective member in a sequential order from an object side toward an image side, the optical systems having optical axes offset from each other;
a second lens unit that is fixed and receives object light fluxes from the pair of optical systems;
a second reflective member that guides the object light fluxes from the pair of optical systems to the second lens unit; and
a switching unit that is disposed in an object side of the second reflective member, and alternately guides the pair of the object light fluxes respectively from the pair of optical systems to the second reflective member,
wherein:

$$0.60 < e/Dp < 1.20;$$

and $$e = \Sigma(d/nd)$$

are satisfied, where Dp is a distance between optical axes of the pair of magnification-varying lens units, d is one of a lens thickness or a lens interval in an optical axis direction, nd is a refractive index for d-line of a medium filling one of the lens thickness or the lens interval, and e represents an air equivalent interval between the aperture stop and a surface on the most object side of the second lens unit.

9. A 3D-image pickup apparatus comprising:
an image pickup element; and
a 3D-image pickup optical system configured to guide a light from an object to the image pickup element,
wherein the 3D-image pickup optical system comprises:
    a pair of optical systems each including a magnification-varying lens unit, an aperture stop, a first lens unit, and a first reflective member in a sequential order from an object side toward an image side, the optical systems having optical axes offset from each other;
    a second lens unit that is fixed and receives object light fluxes from the pair of optical systems;
    a second reflective member that guides the object light fluxes from the pair of optical systems to the second lens unit; and
    a switching unit that is disposed in an object side of the second reflective member, and alternately guides the pair of the object light fluxes respectively from the pair of optical systems to the second reflective member,
wherein:

$$0.60 < e/Dp < 1.20;$$

and $$e = \Sigma(d/nd)$$

are satisfied, where Dp is a distance between optical axes of the pair of magnification-varying lens units, d is one of a lens thickness or a lens interval in an optical axis direction, nd is a refractive index for d-line of a medium filling one of the lens thickness or the lens interval, and e represents an air equivalent interval between the aperture stop and a surface on the most object side of the second lens unit.

\* \* \* \* \*